(No Model.) 2 Sheets—Sheet 1.

G. POTTS.
MECHANICAL MOVEMENT.

No. 361,372. Patented Apr. 19, 1887.

WITNESSES.
Chas N Leonard
E W Bradford

INVENTOR.
George Potts,
PER
C. Bradford
ATTORNEY.

(No Model.) 2 Sheets—Sheet 2.
G. POTTS.
MECHANICAL MOVEMENT.
No. 361,372. Patented Apr. 19, 1887.
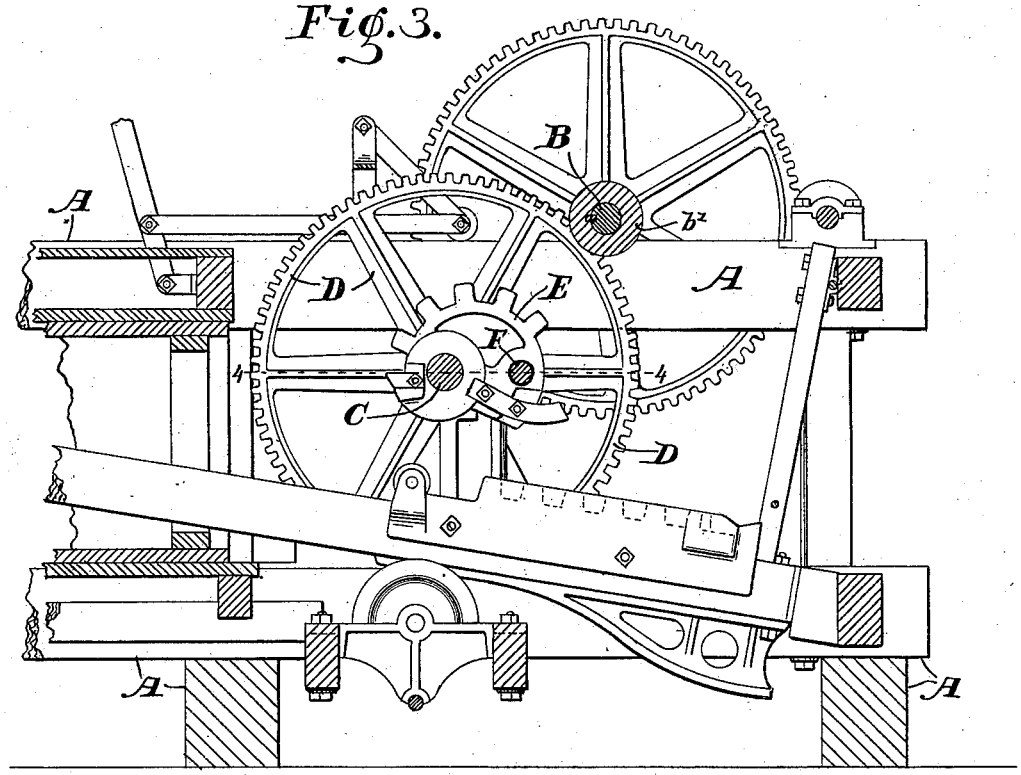
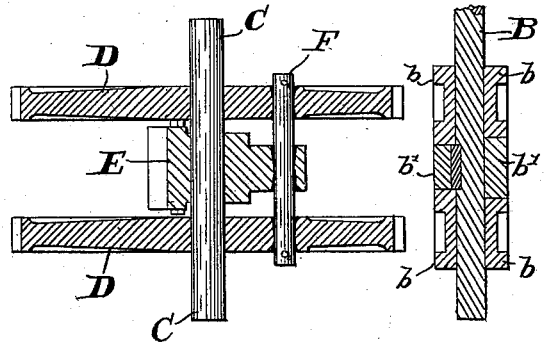
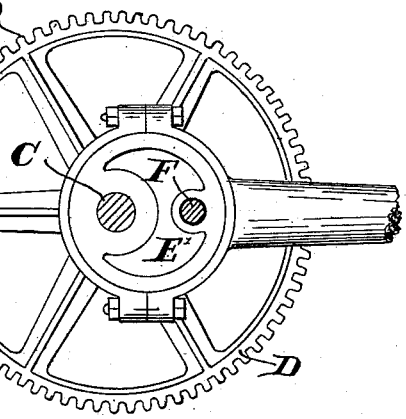
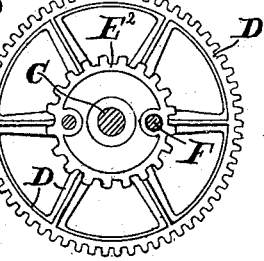
WITNESSES.
Chas. N. Leonard
E. W. Bradford
INVENTOR.
George Potts,
PER
C. Bradford,
ATTORNEY.

UNITED STATES PATENT OFFICE.

GEORGE POTTS, OF INDIANAPOLIS, INDIANA, ASSIGNOR OF ONE-HALF TO S. JOHNSON AND A. D. JOHNSON, BOTH OF SAME PLACE.

MECHANICAL MOVEMENT.

SPECIFICATION forming part of Letters Patent No. 361,372, dated April 19, 1887.

Application filed September 17, 1886. Serial No. 213,777. (No model.)

*To all whom it may concern:*

Be it known that I, GEORGE POTTS, of the city of Indianapolis, county of Marion, and State of Indiana, have invented certain new and useful Improvements in Mechanical Movements, of which the following is a specification.

The object of my said invention is to insure a perfect engagement of two sets of cogged gears when employed in driving a single revolving part placed on the same shaft therewith.

It consists, essentially, in the employment of a pin or rod which passes through said gears and said driven part and connects them together, as will be hereinafter more particularly described.

Figure 1:
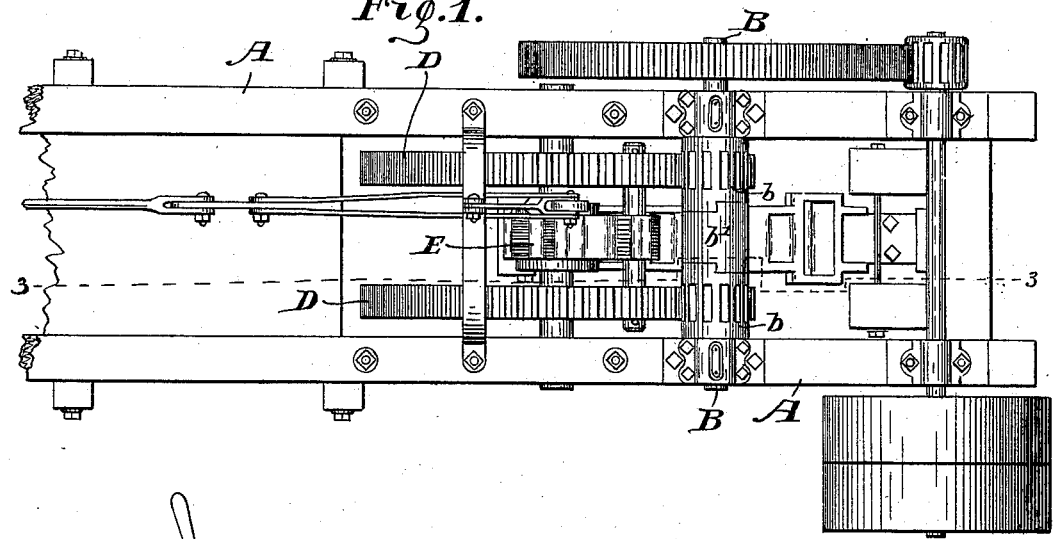
Figure 2:
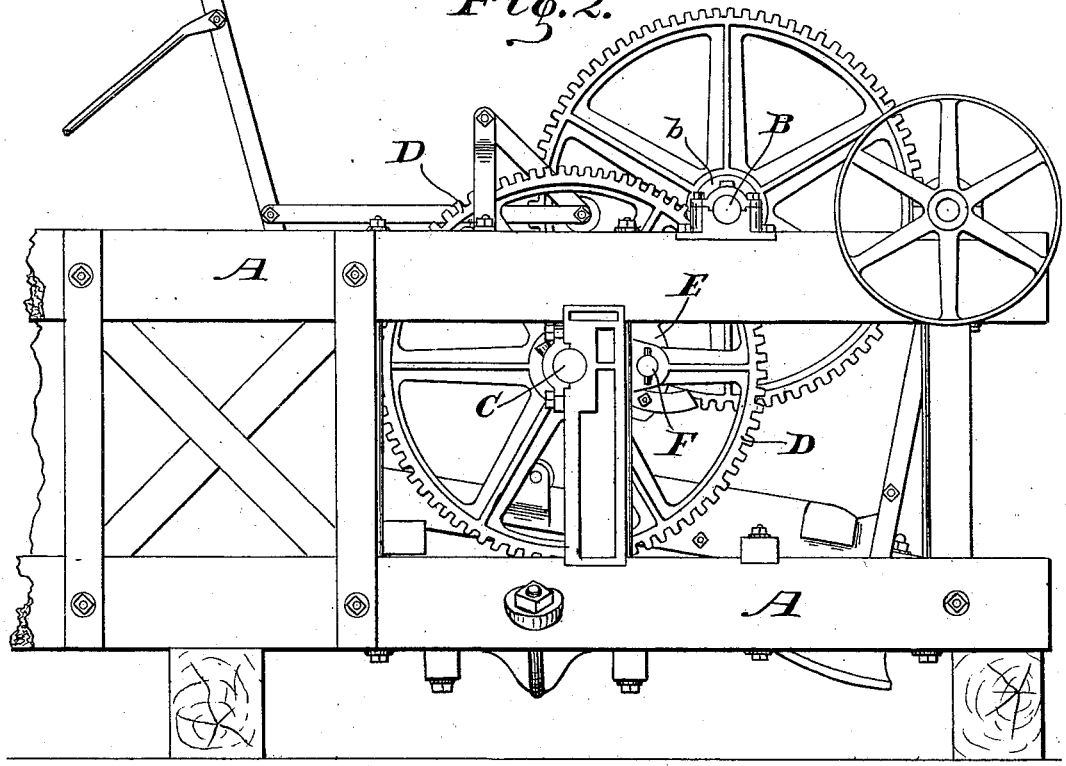

Referring to the accompanying drawings, which are made a part hereof, and on which similar letters of reference indicate similar parts, Figure 1 is a top or plan view of a portion of a press in which my said invention is employed; Fig. 2, a side elevation of the same; Fig. 3, a central vertical section thereof on the dotted line 3 3 in Fig. 1; Fig. 4, a horizontal sectional view through the parts particularly embodying my said invention on the dotted line 4 4 in Fig. 3; Fig. 5, a detail sectional view through the pinions which drive the gear-wheels, their shaft, and a clutch part by which they are secured from rotating thereon; Fig. 6, a view in which is illustrated the use of my invention in connection with a plain eccentric instead of an eccentric gear, such as is used in the press; and Fig. 7 a similar view illustrating the use of my invention with an ordinary cogged gear instead of an eccentric gear or plain eccentric.

In said drawings, the portions marked A represent the frame-work of the machine, B the driving-shaft, C the shaft carrying the cog-wheels, D D said cog-wheels, E the cogged segment, eccentric, cog-wheel, or whatever it is desired shall be driven by means of this invention, and F a rod or bar connecting the gear-wheels and the device which they drive.

The shaft B is an ordinary driving-shaft, and has pinions $b\ b$ thereon, which, in the construction shown, are held from rotating by a clutch portion, $b'$, placed between them and keyed onto the shaft, as shown particularly in Fig. 5.

The shaft C is a plain shaft mounted in appropriate bearings in the frame-work. Upon it are placed the gear-wheels D D and the device E, which is to be driven thereby.

The rod or bar F passes through the gear-wheels D and said device E, and secures their concurrent rotation. It is, however, made slightly loose in its bearings, (see particularly Fig. 4,) and consequently the slight unevenness which is usually present in ordinary gearing does not operate to throw the force upon one or the other of the gear-wheels, but, by reason of the slight oscillation which is permitted by this looseness, a uniform and equal bearing is maintained between the several parts at all times, and all undue strain upon any of them is thus effectually prevented.

The operation is as follows: The pinions $b$ on the shaft B engage with the gear-wheels D and drive them either with or around the shaft C, (they being loosely mounted on said shaft,) and these wheels, through the bar or rod F, drive the device E, which engages with and drives any mechanism desired. In the principal views this device E is shown as a cogged segment which engages with a plunger to a press. In Fig. 6 it is shown as an eccentric, E', driving a pitman, and in Fig. 7 as a cog-wheel, $E^2$, driving an ordinary cog-wheel; but it will be understood that I do not desire to confine myself to either of these, or to any particularly device, but expect to use this invention wherever it can be employed in driving any part of a machine which is capable of being driven in the manner indicated.

It will also be readily seen that while I have shown the invention in connection with a baling-press, it is equally applicable to other machines—as, for instance, brick-machines, tile-machines, and other machines of a similar nature.

Having thus fully described my said inven- tion, what I claim as new, and desire to secure by Letters Patent, is—

1. The combination, with a mechanical device, of two cog-wheels mounted on the same shaft therewith and connected thereto by a pin or bar passing through said device and said cog-wheels.

2. The combination of the shaft C, the mechanical device E, mounted thereon, the wheels D, arranged on said shaft alongside of said device, and the pin or bar F, connecting said device and said wheels together, substantially as shown and described.

In witness whereof I have hereunto set my hand and seal, at Indianapolis, Indiana, this 6th day of September, A. D. 1886.

GEORGE POTTS. [L. S.]

In presence of—
J. B. JOHNSON,
E. W. BRADFORD.